US009327164B2

(12) United States Patent
Morris

(10) Patent No.: US 9,327,164 B2
(45) Date of Patent: May 3, 2016

(54) VERTICAL MOVEMENT VIBRATING EXERCISE AND WELLNESS PLATFORM

(71) Applicant: Nicholas Morris, Redondo Beach, CA (US)

(72) Inventor: Nicholas Morris, Redondo Beach, CA (US)

( * ) Notice: Subject to any disclaimer, the term of this patent is extended or adjusted under 35 U.S.C. 154(b) by 63 days.

(21) Appl. No.: 14/524,183

(22) Filed: Oct. 27, 2014

(65) Prior Publication Data

US 2015/0148193 A1    May 28, 2015

Related U.S. Application Data

(63) Continuation of application No. 13/109,664, filed on May 17, 2011, now Pat. No. 8,870,723.

(60) Provisional application No. 61/395,847, filed on May 17, 2010.

(51) Int. Cl.
| | | |
|---|---|---|
| A63B 24/00 | (2006.01) | |
| A63B 7/00 | (2006.01) | |
| A63B 21/015 | (2006.01) | |
| A63B 21/062 | (2006.01) | |
| A63B 23/035 | (2006.01) | |
| F01B 7/02 | (2006.01) | |
| F02B 23/06 | (2006.01) | |
| F02B 75/28 | (2006.01) | |
| G06F 1/16 | (2006.01) | |
| A63B 21/00 | (2006.01) | |
| A63B 71/00 | (2006.01) | |

(52) U.S. Cl.
CPC ............... *A63B 24/0062* (2013.01); *A63B 7/00* (2013.01); *A63B 21/00069* (2013.01); *A63B 21/015* (2013.01); *A63B 21/062* (2013.01); *A63B 21/14* (2013.01); *A63B 21/1484* (2013.01); *A63B 21/40* (2015.10); *A63B 21/4034* (2015.10); *A63B 21/4043* (2015.10); *A63B 23/0355* (2013.01); *F01B 7/02* (2013.01); *F02B 23/0645* (2013.01); *F02B 75/28* (2013.01); *G06F 1/1626* (2013.01); *A63B 21/1469* (2013.01); *A63B 21/4035* (2015.10); *A63B 71/0054* (2013.01); *A63B 2220/17* (2013.01); *A63B 2225/20* (2013.01); *A63B 2225/50* (2013.01); *A63B 2230/06* (2013.01)

(58) Field of Classification Search
CPC ...................................................... A63B 21/00
USPC .......................... 482/141; 601/131, 23, 29, 49
See application file for complete search history.

(56) References Cited

U.S. PATENT DOCUMENTS

| | | | |
|---|---|---|---|
| 4,492,221 A | 1/1985 | Kerley | |
| 5,271,028 A | 12/1993 | Kondo et al. | |
| 5,484,388 A | 1/1996 | Bassett et al. | |
| 7,367,957 B2 * | 5/2008 | Huang et al. | 601/31 |
| 7,396,957 B2 | 7/2008 | Yada et al. | |
| 8,114,036 B2 | 2/2012 | Krompasick | |
| 2005/0033203 A1 | 2/2005 | Son | |
| 2006/0155221 A1 | 7/2006 | Kim | |
| 2008/0300520 A1 | 12/2008 | Shin | |

* cited by examiner

*Primary Examiner* — Jerome w Donnelly
(74) *Attorney, Agent, or Firm* — Dustin L. Call; Superior IP, PLLC

(57) ABSTRACT

A system for allowing a user to exercise. The system includes a platform, where the platform is configured to support a user during an exercise routine. The system also includes vibration means, where the vibration means moves the platform up and down during the exercise routine.

19 Claims, 5 Drawing Sheets

VERTICAL MOVEMENT VIBRATING EXERCISE AND WELLNESS PLATFORM

CROSS-REFERENCE TO RELATED APPLICATIONS

This application claims the benefit of and priority to U.S. Non-Provisional patent application Ser. No. 13/109,664 filed on May 17, 2011, which application is incorporated herein by reference in its entirety.

U.S. Non-Provisional patent application Ser. No. 13/109,664 claims the benefit of and priority to U.S. Provisional Patent Application Ser. No. 61/395,847 filed on May 17, 2010, which application is incorporated herein by reference in its entirety.

U.S. Non-Provisional patent application Ser. No. 13/109,664 is related to co-pending U.S. application Ser. No. 13/109,652, filed on May 17, 2011, and entitled, "VARIABLE RESISTANCE FITNESS CHAMBER FOR ROTATIONAL TORQUE", which application is incorporated herein by reference in its entirety.

Co-pending U.S. application Ser. No. 13/109,652, filed on May 17, 2011, and entitled, "VARIABLE RESISTANCE FITNESS CHAMBER FOR ROTATIONAL TORQUE" claimed the benefit of and priority to U.S. Provisional Patent Application Ser. No. 61/395,784 filed on May 17, 2010, which application is incorporated herein by reference in its entirety.

U.S. Non-Provisional patent application Ser. No. 13/109,664 is related to co-pending U.S. application Ser. No. 13/109,654, filed on May 17, 2011, and entitled, "BALL NEST WITH VARIABLE RESISTANCE FOR FITNESS AND WELLNESS MOVEMENT", which application is incorporated herein by reference in its entirety.

Co-pending U.S. application Ser. No. 13/109,654, filed on May 17, 2011, and entitled, "BALL NEST WITH VARIABLE RESISTANCE FOR FITNESS AND WELLNESS MOVEMENT" claimed the benefit of and priority to U.S. Provisional Patent Application Ser. No. 61/395,823 filed on May 17, 2010, which application is incorporated herein by reference in its entirety.

U.S. Non-Provisional patent application Ser. No. 13/109,664 is related to co-pending U.S. application Ser. No. 13/109,658, filed on May 17, 2011, and entitled, "VERTICAL MOVEMENT VIBRATING EXERCISE AND WELLNESS PLATFORM", which application is incorporated herein by reference in its entirety.

Co-pending U.S. application Ser. No. 13/109,658, filed on May 17, 2011, and entitled, "VERTICAL MOVEMENT VIBRATING EXERCISE AND WELLNESS PLATFORM" claimed the benefit of and priority to U.S. Provisional Patent Application Ser. No. 61/395,819 filed on May 17, 2010, which application is incorporated herein by reference in its entirety.

U.S. Non-Provisional patent application Ser. No. 13/109,664 is related to co-pending U.S. application Ser. No. 13/109,662, filed on May 17, 2011, and entitled, "VARIABLE-RESISTANCE FUNCTIONAL FITNESS BAG", which application is incorporated herein by reference in its entirety.

Co-pending U.S. application Ser. No. 13/109,662, filed on May 17, 2011, and entitled, "VARIABLE-RESISTANCE FUNCTIONAL FITNESS BAG" claimed the benefit of and priority to U.S. Provisional Patent Application Ser. No. 61/395,822 filed on May 17, 2010, which application is incorporated herein by reference in its entirety.

U.S. Non-Provisional patent application Ser. No. 13/109,664 is related to co-pending U.S. application Ser. No. 13/109,666, filed on May 17, 2011, and entitled, "TRI-CIRCULAR EXERCISE DEVICE WITH VARIABLE ROTATION RESISTANCE", which application is incorporated herein by reference in its entirety.

Co-pending U.S. application Ser. No. 13/109,666, filed on May 17, 2011, and entitled, "TRI-CIRCULAR EXERCISE DEVICE WITH VARIABLE ROTATION RESISTANCE" claimed the benefit of and priority to U.S. Provisional Patent Application Ser. No. 61/395,817 filed on May 17, 2010, which application is incorporated herein by reference in its entirety.

BACKGROUND OF THE INVENTION

The benefits of exercise are numerous and well documented. Exercise can reduce the instance and severity of many diseases. In addition, exercise can make a person feel better about themselves and provide the user with increased self-confidence and feelings of self-worth. However, many would be exercisers are intimidated by complex fitness machines and uncomfortable and unnatural motions associated with exercising. In addition, they may be reluctant to use heavy weights which can cause injury to the user.

An additional problem facing would be exercisers is that many exercises target only a single muscle or group of muscles. As such, many exercisers focus only on what they consider to be "major" muscles. These major muscles then become stronger than surrounding "support" muscles. This can lead to damage of these support muscles as they have insufficient strength to withstand the forces created by the major muscle. These injuries can be minor, causing soreness to the user, or major, causing severe damage to the user's body.

To help overcome this deficiency, various pieces of fitness machines have been created which create a vibration effect. The intention is that the user will have to work to overcome the vibration and maintain his/her balance, exercising the user's support muscles. However, these machines have a number of drawbacks. For example, the machines may create vibrations using a rotary cam which creates the vibration in a near-vertical method by pushing the pedestal up and down or using a mechanical crank style that moves in a seesaw movement (right-up, left-down).

However, these machines suffer from a number of drawbacks. In particular, many of these machines exceed ISO standards (international Organization for Standardization). Additionally, these machines can cause discomfort from excessive g-force and unpleasant feelings due to 'shaking' effect, as they do not produce true vertical movement. Further, these machines pose a danger to a user's joint and soft-tissue, because of the 'shearing' (lateral force on joints) effect. In addition, these machines produce negative effects with spasmodic and random vibration impact into the user's body.

Moreover, these machines can create a "reactive-force" entering the user's body. I.e., as the user performs the exercise movement, the resistance being used causes a reaction force into the user's body. The greater the vibration, the greater the reactive force. Reactive force can cause potential damage if the vibration is too strong for a user and the exercise movement becomes uncontrolled. Additionally, reactive force can also accumulate a "break-down" effect in the ligaments, tendons or other soft tissues in the exercising user, and their associated muscle groups. Further, reactive force is a dissipated energy, and means a less than optimal result to the exerciser, meaning the user receives a poor return on time and effort invested in the exercise.

Further, many exercise systems use unnatural movements. I.e., they involve movements that the user does not perform when not doing that particular exercise. These unnatural movements can cause injury to the user. Often, the user will not even be aware of the injury until it becomes a major injury because they do not perform that movement unless exercising.

Additionally, many of these machines have only a single setting. I.e., the machines are either on or off and the user is unable to select form various amplitudes and/or frequencies of the vibrations. This does not allow the machines to be used by individuals of different fitness levels. In particular, some individuals will be too new to exercising to use the machine while other individuals will be too advanced. Only the small group in the middle will be able to effectively use the machines.

Accordingly, there is a need in the art for an exercise system which produces vibrations that are substantially vertical. Additionally, there is a need in the art for the exercise system to allow the user to select the amplitude and/or the frequency of the vibrations. Further, there is a need in the art for the system to prevent reactive forces from entering the user's body. Moreover there is a need for the exercise system to allow the user to exercise using natural movements.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a system for allowing a user to exercise. The system includes a platform, where the platform is configured to support a user during an exercise routine. The system also includes vibration means, where the vibration means moves the platform up and down during the exercise routine.

Another example embodiment includes a system for allowing a user to exercise. The system includes a base plate. The base plate includes one or more feet for supporting the base plate. The system also includes a motor. The motor is attached to the base plate and is configured to convert electrical energy to rotational motion. The system further includes a drive shaft, where the drive shaft is rotated by the motor and a linkage system. The linkage system is connected to the drive shaft and is configured to convert the rotational motion of the drive shaft to reciprocating vertical linear motion. The system additionally includes a platform. The platform is attached to the linkage system and is configured to support a user during an exercise routine. The system also includes a control module. The control module controls the speed of the motor. The system further includes a display, where the display is configured to show the current settings to a user.

Another example embodiment includes a system for allowing a user to exercise. The system includes a base plate. The base plate includes one or more feet for supporting the base plate. The system also includes a housing, where the housing encloses at least a portion of the system, and a motor. The motor is attached to the base plate and is configured to convert electrical energy to rotational motion. The system further includes a drive shaft, where the drive shaft is rotated by the motor. The system additionally includes a bearing system, where the bearing system is configured to support the drive shaft relative to the base plate, and a linkage system. The linkage system is attached to the base plate, is connected to the drive shaft and is configured to convert the rotational motion of the drive shaft to reciprocating linear motion. The system also includes a platform. The platform is attached to the linkage system, is configured to support a user during an exercise routine and includes at least a portion that is substantially transparent. The system further includes a control module. The control module controls the speed of the motor and the amplitude of the reciprocating linear motions. The speed of the motor controls the frequency of the reciprocating linear motion. The system additionally includes a control panel, where the control panel allows a user to change one or more settings controlled by the control module. The system also includes a display, where the display is configured to show the current settings to a user.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
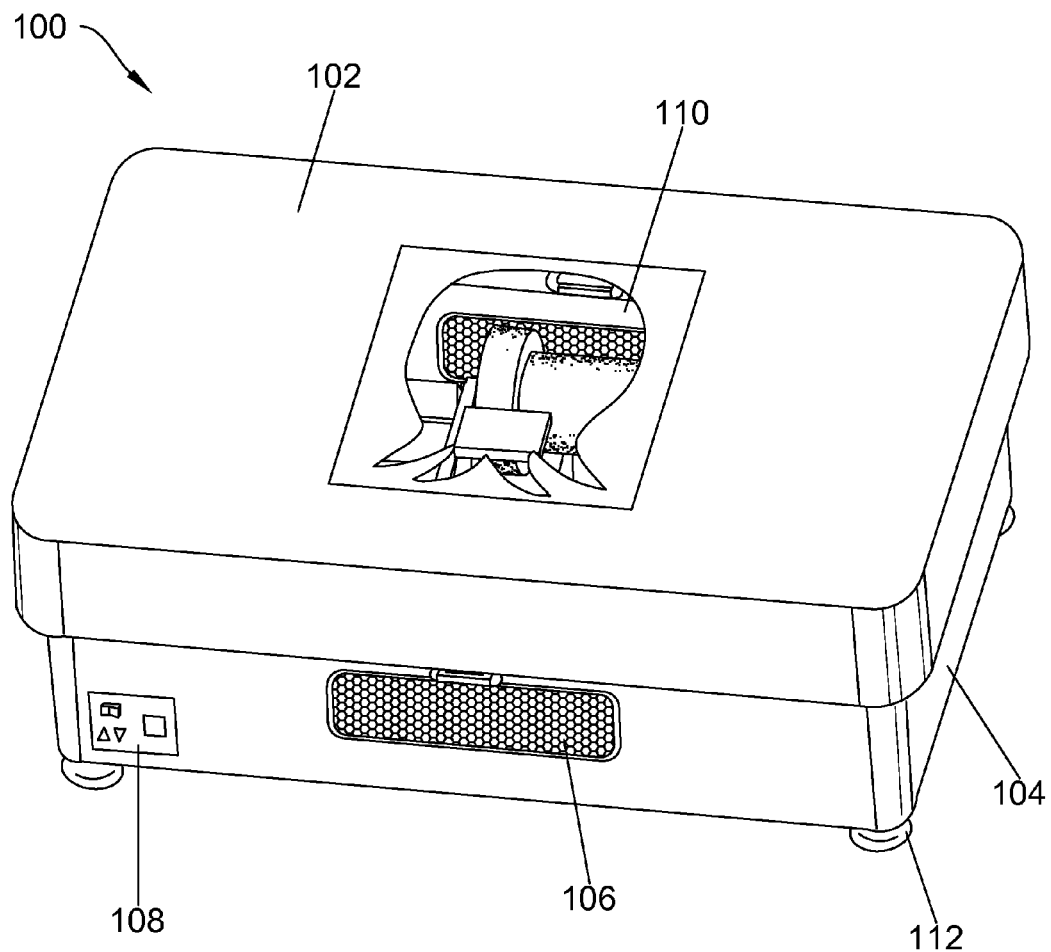
FIG. 1 illustrates an example of an exercise system.

FIG. 1 illustrates an example of an exercise system 100. In at least one implementation, the exercise system 100 can be used to increase the physical fitness of a user. In particular, the exercise system 100 can allow the user to perform a variety of movements with varying amplitude and frequency of vertical vibrations. The vibrations can be substantially free from lateral movement which can reduce or eliminate the reactive force transmitted to the user's body. I.e., the exercise system 100 can increase the user's physical fitness with a reduced chance of injury.

FIG. 1 shows that the exercise system 100 can include a platform 102. In at least one implementation, the platform 102 can move back and forth vertically at an amplitude and frequency to be determined by the user. As the platform 102 vibrates, the user must use his/her muscles to maintain his/her balance. I.e., the user is constrained to react by contracting and relaxing his/her muscles, thus exercising those muscles.

FIG. 1 also shows that the exercise system 100 can include a housing 104. In at least one implementation, the housing 104 can surround and protect the other elements of the exercise system 100. In particular, the housing 104 can be configured to ensure that the other elements of the exercise system 100 are in the proper position relative to one another.

FIG. 1 further shows that the housing 104 can include a ventilation window 106. In at least one implementation, the ventilation window 106 can allow air exchange between the interior and the exterior of the housing 104. In particular, as the electrical elements of the exercise system 100 are in use, they will produce heat as a byproduct of the electrical resistance. The heat can be dissipated by the air exchange through the ventilation window 106. The ventilation window 106 can include a series or holes or openings through the housing 104 material. Additionally or alternatively, the ventilation window 106 can include a fan or other device for increasing the rate of air flow through the ventilation window 106.

FIG. 1 additionally shows that the exercise system 100 can include a control 108. In at least one implementation, the control 108 can allow the user to modify parameters of the exercise routine. For example, the control 108 can allow the user to adjust the amplitude or the frequency of the movement of the platform 102. Additionally or alternatively, the control 108 can allow the user to set an exercise timer or control lighting options of the exercise system 100, as described below.

One of skill in the art will appreciate that the control 108 can include any desired user interface. For example, the control 108 can include knobs or switches which allow the user to adjust the settings. Additionally or alternatively, the control 108 can include a display allowing the user to see the current settings and or change the settings, such as a touch screen display. The control 108 can allow the user direct control over the settings and/or can include pre-programmed routines which controls the settings. The pre-programmed routines can be either dynamic or static. I.e., the routines can set the control 108 settings, which remain unchanged throughout the routine, or can vary the control 108 settings during the routine to exercise different muscle groups and/or at different intensities. Additionally or alternatively, the control 108 can include a remote control which allows a user to remotely change the settings of the exercise system 100.

FIG. 1 also shows that the exercise system 100 can include a performance window 110. In at least one implementation, the performance window 110 can allow the user to see the interior of the housing 104. In particular, the performance window 110 can allow the user to see the moving elements of the exercise system 100. The performance window 110 can include a material such as glass, plastic or other polymers, which are of sufficient strength to support the user during exercise. Additionally or alternatively, the performance window 110 can be of a desired shape or size to portray a logo to the user. For example, the shape of the performance window 110 can be a pineapple or other shape.

Additionally or alternatively, the performance window 110 can allow the user to see a display. For example, the performance window 110 can allow a user to see a display which shows statistics about the user's workout, such as current settings, time remaining in the exercise routine, time spent working out, estimated calories burned or the like, as described below. In particular, the performance window 110 can protect the display while allowing the user to access the displayed information.

FIG. 1 further shows that the exercise system 100 can include one or more feet 112. In at least one implementation, the one or more feet 112 can support the weight of the exercise system 100 and the user. Additionally or alternatively, the one or more feet 112 can prevent the exercise system 100 from moving along the surface on which the exercise system 100 is resting. For example, the one or more feet 112 can include rubber or other non-slip materials which are intended to prevent or restrict movement of the exercise system 100 during an exercise routine or as a user steps on to or off of the exercise system 100.

One of skill in the art will appreciate that the exercise system 100 can include other elements for supporting the exercise system 100 and/or allowing the user to relocate the exercise system 100. For example, the exercise system 100 can include one or more wheels, allowing the user to more easily move the exercise system 100. Additionally or alternatively, the exercise system 100 can include one or more handles, allowing the user to lift some or all of the weight of the exercise system 100.

In at least one implementation, the exercise bag 100 can be configured to electronically communicate with an external device. For example, the exercise bag 100 can be connected to a computer, a smart phone, a gaming console or any other electronic device. The electronic device can monitor the user's movements and/or the effectiveness of the user's exercise routine. For example, the electronic device can measure the user's heart rate or provide feedback for the user's exercise routine. E.g., the electronic device can monitor the motion of the various parts of the exercise bag 100 and inform the user regarding motion that is overextended or underextended or regarding motion that includes starts and stops or interruptions to the user's exercise routine. Additionally or alternatively, the electronic device can provide information over numerous exercise sessions or routines. For example, the electronic device can show the user's progress as the user increases in strength and health.

The exercise bag 100 can connect to the external device using any communications means. For example, the exercise bag 100 can be physically connected or can be wirelessly connected to the external device. Additionally or alternatively, the exercise bag 100 can connect to the external device using a network. The network exemplarily includes the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network includes one or more cellular RF networks and/or one or more wired and/or wireless networks such as, but not limited to, 802.xx networks, Bluetooth access points, wireless access points, IP-based networks, or the like. For example, the network can include cloud based networking and computing. The network can also include servers that enable one type of network to interface with another type of network.

Figure 2:
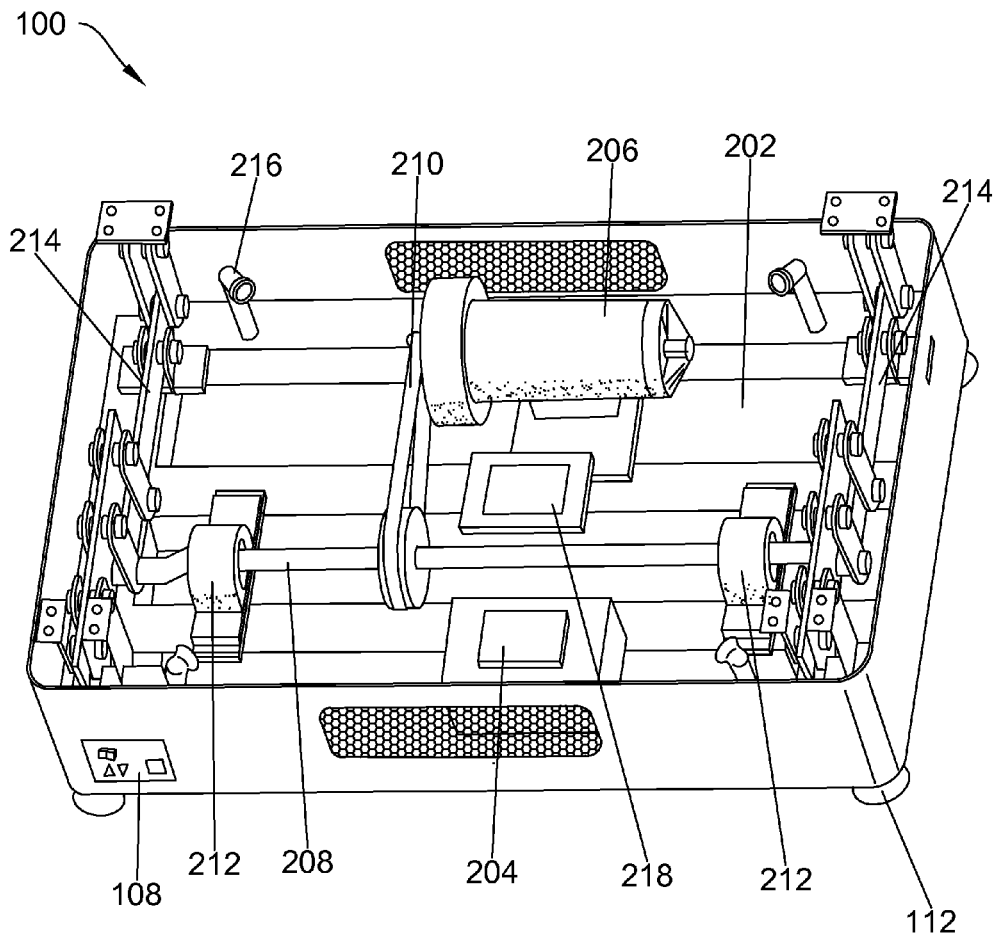
FIG. 2 illustrates a cross-section of the exercise system.

FIG. 2 illustrates a cross-section of the exercise system 100. In at least one implementation, the exercise system 100 can produce the desired vertical vibrations. In particular, the exercise system 100 can allow the user to control the amplitude and the frequency of the vibrations of produced. This can, in turn, allow the exercise system 100 to be used by users of different fitness levels.

FIG. 2 shows that the exercise system 100 can include a base plate 202. In at least one implementation, the base plate 202 can include one or more grooves or indentations for receiving other elements of the exercise system 100. In particular, the base plate 202 can be of a proper size and shape to receive the other elements of the exercise system 100. Additionally or alternatively, the base plate 202 can be configured to receive external elements such as feet 112 or attach to external devices.

FIG. 2 also shows that the exercise system 100 can include a control module 204. In at least one implementation, the control module 204 can control the operation of the exercise system 100. For example, the control module 204 can receive the setting input to the control 108 by the user. The control module 204 can then modify the operation of the elements to produce the proper motion. Additionally or alternatively, the control module 204 can adjust the settings of the exercise system 100 to produce a preprogrammed exercise routine.

FIG. 2 further shows that the exercise system 100 can include a motor 206. In at least one implementation, the motor 206 can convert electrical power to motion. In particular, the motor 206 can produce a rotating motion. The rotating motion can then be converted to vertical motion of the platform 102, as described below.

FIG. 2 additionally shows that the exercise system 100 can include a drive shaft 208. In at least one implementation, the drive shaft 208 can be rotated by the motor 206. In particular, the drive shaft 208 can be used to convert the rotational energy produced by the motor 206 to vertical motion of the platform 102. The drive shaft 28 can include an enlarged section for connecting the drive shaft 208 to the motor 206, as described below.

FIG. 2 also shows that the exercise system 100 can include a belt 210. In at least one implementation, the belt 210 can connect the rotation of the motor 206 to rotation of the drive shaft 208. I.e., the belt 210 can be moved by the motor 206. The belt can then interact with the drive shaft 208, rotating the drive shaft 208. In at least one implementation, the belt 210 can slip if the forces involved become too large. I.e., if the force needed to move the platform become too large, the interaction between the belt 210 and the motor 206 and/or the belt 210 and the drive shaft 208 can slip, preventing motion of the driveshaft 208 which would damage the exercise system 100 if allowed.

The belt 210 can allow the rotational speed of the drive shaft 208 to vary from the rotational speed of the motor 206. In particular, the linear speed of the circumference of the motor 206, the enlarged section of the drive shaft 208 and the belt 210 can all be the same but the rotations per minute (rpm) of the motor 206 can vary with any ratio to the rpms of the drive shaft 208. One of skill in the art will appreciate that any desired connection between the drive shaft 208 and the motor 206 can be used. For example, the connection can include a direct connection, gears or the like.

FIG. 2 further shows that the exercise system 100 can include a bearing system 212. In at least one implementation, the bearing system 212 can ensure uniform rotation of the drive shaft 208. In particular, the vertical motion of the platform and the operation of the motor 206 and imperfections in the drive shaft 208 can all cause vibrations within the exercise system 100. The vibrations can prevent uniform rotation of the drive shaft 208. The bearing system 212 can prevent the vibrations from disrupting the rotation of the drive shaft 208. Additionally or alternatively, the bearing system 212 can ensure that the drive shaft 208 remains a fixed distance from the base plate 202.

FIG. 2 additionally shows that the exercise system 100 can include a linkage system 214. In at least one implementation, the linkage system 214 can produce the desired vertical motion. In particular, the linkage system 214 can convert rotation of the drive shaft 208 to vertical motion of the platform 102, as described below.

FIG. 2 also shows that the exercise system 100 can include a performance illuminator 216. In at least one implementation, the performance illuminator 216 can produce a light pattern to inspire a user. The light pattern can include any selected color, and any selected pattern chosen by the user. For example, the performance illuminator 216 can 'pulse' with light in synchrony with the vertical movement created by the exercise system 100. Additionally or alternatively, the performance illuminator 216 can provide visual indicators to the user regarding the status of his/her workout.

FIG. 2 further shows that the exercise system 100 can include a display 218. In at least one implementation, the display 218 can provide the user with information regarding his/her exercise routine. For example, the display 218 can show statistics about the user's workout, such as current settings, time remaining in the exercise routine, time spent working out, estimated calories burned or the like.

Figure 3A:
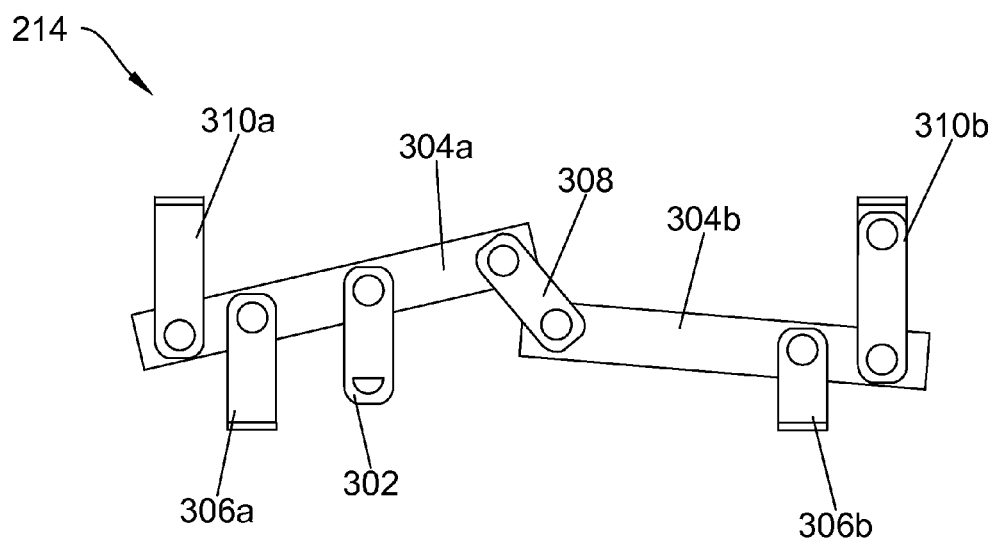
FIG. 3A illustrates an example of a linkage system in a first position.
Figure 3B:
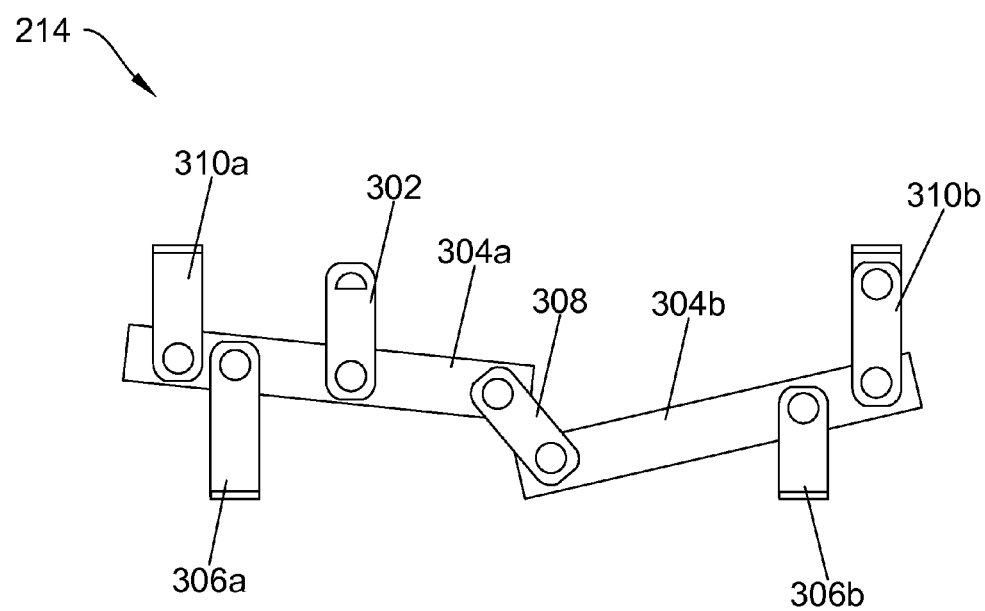
FIG. 3B shows the linkage system in a second position.

FIGS. 3A and 3B illustrate an example of a linkage system 214. FIG. 3A illustrates an example of the linkage system 214 in a first position; and FIG. 3B shows the linkage system 214 in a second position. In at least one implementation, the linkage system 214 can convert rotational motion to vertical motion. I.e., the linkage system 214 can produce vertical vibrations of the frequency and amplitude desired by the user.

FIGS. 3A and 3B show that the linkage system 214 can include a shaft attachment 302. In at least one implementation, the shaft attachment 302 can be connected to a drive shaft, such as the drive shaft 208 of FIG. 2. In particular, the shaft attachment 302 can be rotated by an attached drive shaft.

FIGS. 3A and 3B also show that the linkage system 214 can include a first rod 304a and a second rod 304b (collectively "rods 304"). In at least one implementation, the rods 304 can provide the necessary leverage to lift and lower the platform, producing the required vertical vibrations. In particular, as the shaft attachment 302 rotates the movement can be transmitted to the rods 304.

FIGS. 3a and 3B further show that the linkage system 214 can include a first support 306a and a second support 306b (collectively "supports 306"). In at least one implementation, the first support 306a and the second support 306b support the first rod 304a and the second rod 304b respectively. In particular, the connection between the supports 306 and the rods 304 can allow the rods 304 to rotate relative to the supports 306. The position of the supports 306 can be fixed within an exercise system, such that any force supplied on the rods 304 by the shaft attachment 302 can tend to rotate the rods 304 around the attachment point between the rods 304 and the supports 306. I.e., the rods "see-saw" about the attachment point between the rods 304 and the supports 306.

FIGS. 3A and 3B additionally show that the linkage system 214 can include a connector 308. In at least one implementation, the connector 308 can connect the first rod 302a to the second rod 302b. The attachment between the connector 308 and the first rod 302a can allow the connector 308 to rotate relative to the first rod 302a. Likewise, the attachment between the connector 308 and the second rod 302b can allow the connector 308 to rotate relative to the first rod 302b. This can allow the first rod 302a and the second rod 302b to move both sides of the platform in unison with one another.

FIGS. 3A and 3B also show that the linkage system 214 can include a first platform support 310a and a second platform support 310b (collectively "platform supports 310"). In at least one implementation, the platform supports 310 can connect to a platform. In particular, the platform supports 310 can move up and down, creating vertical movement in the connected platform. The attachment between the platform supports 310 and the rods 304 can allow the platform supports 310 to rotate relative to the rods 304. This can allow the attached platform to remain in a substantially horizontal position during movement, as described below.

FIG. 3A shows that when the shaft attachment 302 is in its lowest position the attachment point between the first rod 304a and the shaft attachment 302 is in a raised position. In turn, the first rod 304a has rotated about the attachment point between the first rod 304a and the first support 306a. Consequently, the attachment point between the first rod 304a and the first platform support 310a has been lowered, moving the platform to a lower position. Likewise, as the connector 308 is raised it raises the attachment point between the connector 308 and the second rod 302b. As a result, the second rod 304b has rotated about the attachment point between the second rod 304b and the second support 306b. Consequently, the attachment point between the second rod 304b and the second platform support 310b has been lowered, moving the platform to a lower position.

In contrast, FIG. 3B shows that when the shaft attachment 302 is in its highest position the attachment point between the first rod 304a and the shaft attachment 302 is in a lowered position. One of skill in the art will appreciate that the shaft attachment 302 has been rotated about a point that is near, but not concurrent with the attachment point between the shaft attachment 302 and the first rod 304a relative to FIG. 3A. In turn, the first rod 304a has rotated about the attachment point between the first rod 304a and the first support 306a. Consequently, the attachment point between the first rod 304a and the first platform support 310a has been raised, moving the platform to a higher position. Likewise, as the connector 308 is lowered it lowers the attachment point between the connector 308 and the second rod 302b. As a result, the second rod 304b has rotated about the attachment point between the second rod 304b and the second support 306b. Consequently, the attachment point between the second rod 304b and the second platform support 310b has been raised, moving the platform to a higher position.

Figure 4:
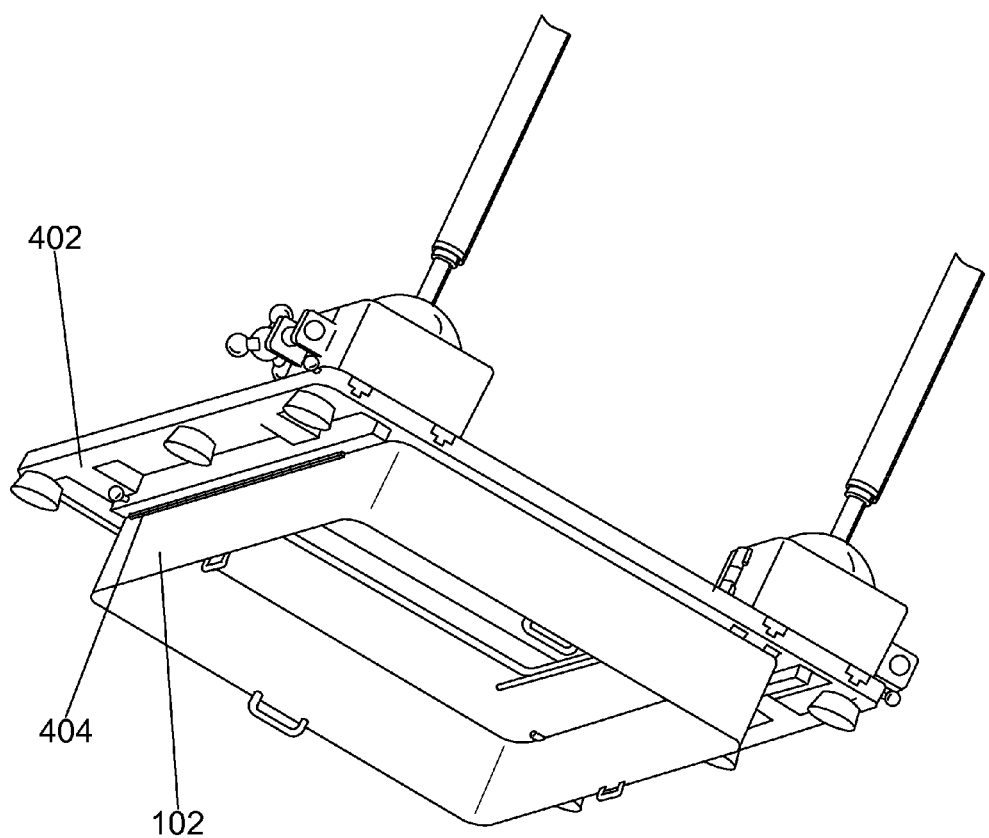
FIG. 4 illustrates a bottom perspective view of an example of a platform.

FIG. 4 illustrates a bottom perspective view of an example of a platform 102. In at least one implementation, the platform 102 can support a user during an exercise routine. I.e., the platform 102 can support the weight of the user. The platform 102 can be moved in a reciprocal manner, producing vertical vibrations, as desired by a user.

FIG. 4 shows that the platform 102 an be attached to an external device 402. For example, the external device 402 can include a portable plate. An example of a portable plate is disclosed in co-pending U.S. application Ser. No. 13/109,654, filed on May 17, 2011, and entitled, "BALL NEST WITH VARIABLE RESISTANCE FOR FITNESS AND WELLNESS MOVEMENT", previously referenced.

One of skill in the art will appreciate that attaching the platform 102 to an external device 402 can make for a more effective exercise routine than can be provided by either the platform 102 or the external device 402 alone. In particular, the movement of the platform 102 can mean that the user is constrained to balance the vertical movement of the platform 102 as well as perform the exercise routine of the external device 402.

FIG. 4 shows that the external device can be attached using a connector 404. In at least one implementation, the connector 404 can include a portion of the external device 402 which is configured to prevent the external device 402 from moving laterally on the platform 102. Additionally or alternatively, the connector 404 can include a snap, blot, latch or any other connector.

Figure 5:
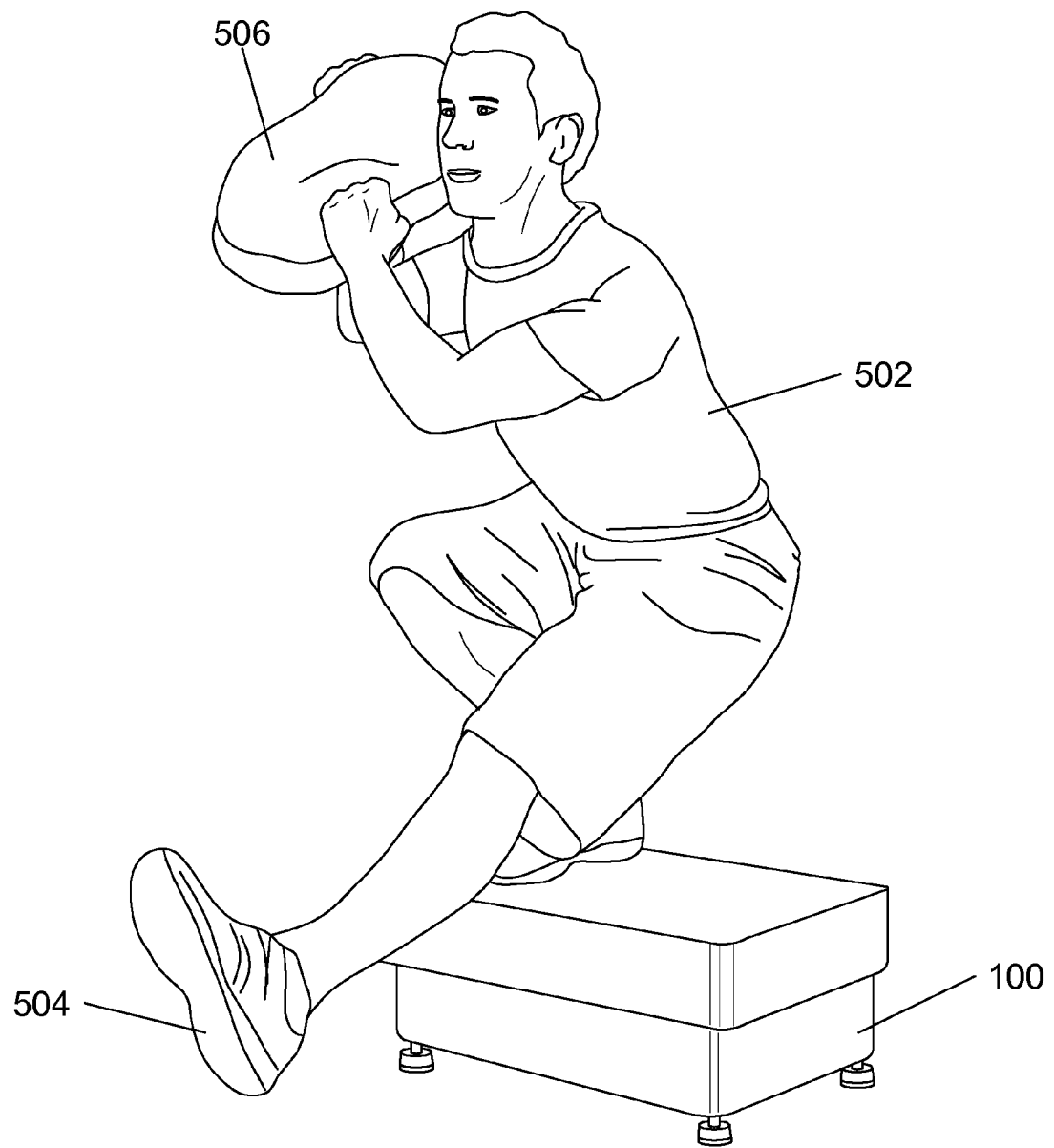
FIG. 5 illustrates an example of a user using the exercise system.

FIG. 5 illustrates an example of a user 502 using the exercise system 100. In at least one implementation, the user 502 can use the exercise system 100 to tone or strengthen his/her muscles. In particular, the exercise system 100 recreates natural movements of the human body, allowing the user 502 to exercise with little or no detrimental impact to the body of the user 502. I.e., the exercise system allows the user 502 to exercise using natural movements and low impact resistance.

FIG. 5 shows that the user 502 can stand on the exercise system 100. In at least one implementation, the user 502 is must balance himself/herself on the platform 102. However, the platform is moving up and down. Therefore, a portion of the body of the user 502 which is held out, such as the user's foot 504 is more difficult to hold in position that on a stable surface, such as a floor.

FIG. 5 also shows that the user 502 can use a supplemental exercise device 506, such as a variable-resistance functional fitness bag. An example of a variable-resistance functional fitness bag is disclosed in co-pending U.S. application Ser. No. 13/109,662, filed on May 17, 2011, and entitled, "VARIABLE-RESISTANCE FUNCTIONAL FITNESS BAG", previously referenced. Additionally or alternatively, the user 502 can use other supplemental exercise devices 506, such as weights or other exercise systems while using the exercise system 100.

Additionally or alternatively, the user 502 can use a supplemental exercise device, such as the exercise system using a variable resistance fitness chamber. An example of a variable resistance fitness chamber is disclosed in co-pending U.S. application Ser. No. 13/109,652, filed on May 17, 2011, and entitled, "VARIABLE RESISTANCE FITNESS CHAMBER FOR ROTATIONAL TORQUE", previously referenced. In particular, the user 502 can balance himself/herself on the platform 102 while using the exercise system using a variable resistance fitness chamber. However, the platform 102 is moving up and down. Therefore, the user 502 must balance himself/herself while directing the movement of the rings, making the exercise routine more difficult and, consequently, more beneficial to the user.

Additionally or alternatively, the user 502 can use a supplemental exercise device, such as the exercise system using a ball nest. An example of a ball nest is disclosed in co-pending U.S. application Ser. No. 13/109,654, filed on May 17, 2011, and entitled, "BALL NEST WITH VARIABLE RESISTANCE FOR FITNESS AND WELLNESS MOVEMENT", previously referenced. In particular, the user 502 can balance himself/herself on the platform 102 while using the exercise system using a ball nest. However, the platform 102 is moving up and down. Therefore, the user 502 must balance himself/herself while directing the movement of the rings, making the exercise routine more difficult and, consequently, more beneficial to the user.

Additionally or alternatively, the user 502 can use a supplemental exercise device, such as the exercise system using a variable resistance pulley. An example of a variable resistance pulley is disclosed in co-pending U.S. application Ser. No. 13/109,664, filed on May 17, 2011, and entitled, "VARIABLE RESISTANCE PULLEY FOR BODY-WEIGHT ROTATION EXERCISE", previously referenced. In particular, the user 502 can balance himself/herself on the platform 102 while using the exercise system using a variable resistance pulley. However, the platform 102 is moving up and down. Therefore, the user 502 must balance himself/herself while directing the movement of the rings, making the exercise routine more difficult and, consequently, more beneficial to the user.

Additionally or alternatively, the user 502 can use a supplemental exercise device, such as a tri-circular exercise device. An example of a tri-circular exercise device is disclosed in co-pending U.S. application Ser. No. 13/109,666, filed on May 17, 2011, and entitled, "TRI-CIRCULAR EXERCISE DEVICE WITH VARIABLE ROTATION RESISTANCE", previously referenced. In particular, the user 502 can balance himself/herself on the secondary plates or the main plate. However, the secondary plate and/or the main plate are rotating. Therefore, the user 502 must balance himself/herself while directing the rotation of the secondary plates and/or the main plate, making the exercise routine more difficult and, consequently, more beneficial to the user.

Additionally or alternatively, the user 502 can use other supplemental exercise devices, such as weights or other exercise systems, while using the exercise system 100.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for allowing a user to exercise, the system comprising:
   a platform, wherein the platform:
      is configured to support a user during an exercise routine; and
      includes a window wherein the window is substantially transparent; and
   vibration means, wherein the vibration means moves the platform up and down during the exercise routine.

2. The system of claim 1, wherein the window is located near the center of the platform.

3. The system of claim 1, wherein the window is shaped as a logo.

4. A system for allowing a user to exercise, the system comprising:
   a base plate, wherein the base plate includes:
      one or more feet for supporting the base plate;
   a motor, wherein the motor is:
      attached to the base plate; and
      configured to convert electrical energy to rotational motion;
   a drive shaft, wherein the drive shaft is rotated by the motor;
   a linkage system, wherein the linkage system is:
      connected to the drive shaft; and
      configured to convert the rotational motion of the drive shaft to reciprocating vertical linear motion;
   a platform, wherein the platform is:
      attached to the linkage system; and
      configured to support a user during an exercise routine;
   a control module, wherein the control module controls the speed of the motor; and
   a display, wherein the display is configured to show the current settings to a user.

5. The system of claim 4, wherein the linkage system includes a shaft connector, wherein the shaft connector:
   is attached to the drive shaft; and
   rotates relative to the linkage system.

6. The system of claim 5, wherein the linkage system includes:
   a rod, wherein a portion of the rod is moved up and down by the shaft connector.

7. The system of claim 6, wherein the linkage system further includes:
   a support, wherein the support is attached to the base plate; and
   is attached to the rod, wherein the rod is configured to rotate about an attachment point relative to the support.

8. The system of claim 7, wherein the linkage system further includes:
   a platform support, wherein the platform support is:
      attached to the rod; and
      attached to the platform.

9. The system of claim 8, wherein:
   the shaft connector is attached to a first portion of the rod on a first side of the attachment point between the support and the rod; and
   the platform support is attached to a second portion of the rod on a second side of the attachment point between the support and the rod;
   movement of the first portion in a first direction by the shaft connector results in movement of the second portion in a second direction; and
   the first direction is opposite the second direction.

10. The system of claim 4 further comprising a bearing system, wherein the bearing system is configured to support the drive shaft relative to the base plate.

11. The system of claim 4 further comprising a remote control, wherein the remote control allows a user to change one or more settings controlled by the control module.

12. The system of claim 4 further comprising one or more wheels, wherein the one or more wheels are configured to support at least a portion of the exercise system when being moved by a user.

13. A system for allowing a user to exercise, the system comprising:
   a base plate, wherein the base plate includes:
      one or more feet for supporting the base plate;
   a housing, wherein the housing encloses at least a portion of the system;
   a motor, wherein the motor is:
      attached to the base plate; and
      configured to convert electrical energy to rotational motion;
   a drive shaft, wherein the drive shaft is rotated by the motor;
   a bearing system, wherein the bearing system is configured to support the drive shaft relative to the base plate;
   a linkage system, wherein the linkage system is:
      attached to the base plate;
      connected to the drive shaft; and
      configured to convert the rotational motion of the drive shaft to reciprocating linear motion;
   a platform, wherein the platform:
      is attached to the linkage system;
      is configured to support a user during an exercise routine; and
      includes at least a portion that is substantially transparent;
   a control module, wherein the control module controls:
      the speed of the motor; and
      the amplitude of the reciprocating linear motions;
   wherein the speed of the motor controls the frequency of the reciprocating linear motion;

a control panel, wherein the control panel allows a user to change one or more settings controlled by the control module; and a display, wherein the display is configured to show the current settings to a user.

14. The system of claim 13 further comprising a performance illuminator, wherein the performance illuminator is configured to turn on and off a light with a frequency that matches the frequency of the reciprocating linear motion.

15. The system of claim 13, wherein the display is located within the housing.

16. The system of claim 15, wherein the display is visible through the portion of the platform that is substantially transparent.

17. The system of claim 13, wherein the position of the one or more feet are adjustable relative to the base plate.

18. The system of claim 17, wherein the one or more feet are attached to the base plate using a threaded connector.

19. The system of claim 13, wherein the threaded connector includes one of:

a screw; or a bolt.

* * * * *